United States Patent
Ben-Avraham et al.

(10) Patent No.: US 6,623,902 B1
(45) Date of Patent: *Sep. 23, 2003

(54) LIQUID TONER AND METHOD OF PRINTING USING SAME

(75) Inventors: Peretz Ben-Avraham, Rehovot (IL); Becky Bossidan, Rishon-Lezion (IL); Benzion Landa, Nes-Ziona (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/048,554

(22) PCT Filed: Jan. 17, 2000

(86) PCT No.: PCT/IL00/00031

§ 371 (c)(1), (2), (4) Date: Feb. 1, 2002

(87) PCT Pub. No.: WO01/53895

PCT Pub. Date: Jul. 26, 2001

Related U.S. Application Data

(63) Continuation-in-part of application No. 08/203,596, filed on Feb. 28, 1994, now Pat. No. 6,146,803, which is a continuation of application No. 07/676,422, filed on Mar. 28, 1991, now abandoned.

(51) Int. Cl.[7] .................................................. G03G 9/13

(52) U.S. Cl. ....................................... 430/114; 430/115

(58) Field of Search .................................. 430/114, 115

(56) References Cited

U.S. PATENT DOCUMENTS

| | | |
|---|---|---|
| 3,863,603 A | 2/1975 | Buckley et al. |
| 3,869,397 A | 3/1975 | Tellier |
| 3,959,574 A | 5/1976 | Seanor et al. |
| 4,678,317 A | 7/1987 | Grossinger |
| 4,684,238 A | 8/1987 | Till et al. |
| 4,690,539 A | 9/1987 | Radulski et al. |

(List continued on next page.)

FOREIGN PATENT DOCUMENTS

| | | |
|---|---|---|
| DE | 241 491 | 12/1986 |
| EP | 0 305 524 | 3/1989 |
| EP | 0 373 652 | 6/1990 |
| GB | 2 029 040 | 3/1980 |
| WO | WO 89/12258 | 12/1989 |
| WO | WO 90/04216 | 4/1990 |
| WO | WO 92/17823 | 10/1992 |
| WO | WO 93/01531 | 1/1993 |
| WO | WO 95/10801 | 4/1995 |
| WO | WO 96/29633 | 9/1996 |
| WO | WO 96/35182 | 11/1996 |
| WO | WO 97/07433 | 2/1997 |
| WO | WO 97/17823 | 5/1997 |
| WO | WO 97/39385 | 10/1997 |
| WO | WO 98/55901 | 12/1998 |
| WO | WO 99/45433 | 9/1999 |
| WO | WO 99/61958 | 12/1999 |
| WO | WO 01/02910 | 1/2001 |
| WO | WO 01/06325 | 1/2001 |

OTHER PUBLICATIONS

Database WPI; Section Ch, Week 198931; Derwent Publications Ltd.; London, GB; Class A04, AN 1989–223001; XP002147328; & JP 01 145666 (RICOH) abstract.

MITA IND KK; English Abstract of Japanese Patent Document No. J 63–058356; Orbit Search Service, File WPAT Accesion No. 88–109083/16.

*Primary Examiner*—Mark A. Chapman
(74) *Attorney, Agent, or Firm*—Fenster & Company

(57) ABSTRACT

A liquid toner comprising: a carrier liquid; and toner particles dispersed in the carrier liquid, said toner particles comprising: a polymer blend comprising: a first polymer comprising a minor portion of said blend and having a relatively higher chemical reactivity with paper; and a second polymer comprising a major portion of said blend and having a relatively lower or null chemical reactivity with paper.

18 Claims, 2 Drawing Sheets

U.S. PATENT DOCUMENTS

| | | |
|---|---|---|
| 4,794,651 A | 12/1988 | Landa et al. |
| 4,842,974 A | 6/1989 | Landa et al. |
| 4,845,006 A | 7/1989 | Matsubara et al. |
| 4,860,924 A | 8/1989 | Simms et al. |
| 4,957,844 A | 9/1990 | Page |
| 4,974,027 A | 11/1990 | Landa et al. |
| 4,980,259 A | 12/1990 | Landa et al. |
| 4,985,732 A | 1/1991 | Landa et al. |
| 4,990,424 A | 2/1991 | Van Dusen et al. |
| 5,001,031 A | 3/1991 | Yamamoto et al. |
| 5,028,964 A | 7/1991 | Landa et al. |
| 5,034,778 A | 7/1991 | Levanon et al. |
| 5,047,306 A | 9/1991 | Almog |
| 5,047,307 A | 9/1991 | Landa et al. |
| 5,047,808 A | 9/1991 | Landa et al. |
| 5,078,504 A | 1/1992 | Landa et al. |
| 5,117,263 A | 5/1992 | Adam et al. |
| 5,148,222 A | 9/1992 | Lior et al. |
| 5,157,238 A | 10/1992 | Landa et al. |
| 5,166,734 A | 11/1992 | Pinhas et al. |
| 5,192,638 A | 3/1993 | Landa et al. |
| 5,208,130 A | 5/1993 | Almog et al. |
| 5,225,306 A | 7/1993 | Almog et al. |
| 5,231,454 A | 7/1993 | Landa |
| 5,255,058 A | 10/1993 | Pinhas et al. |
| 5,264,312 A | 11/1993 | Stolka et al. |
| 5,266,435 A | 11/1993 | Almog |
| 5,268,687 A | 12/1993 | Peled et al. |
| 5,270,776 A | 12/1993 | Landa |
| 5,276,492 A | 1/1994 | Landa et al. |
| 5,278,615 A | 1/1994 | Landa |
| 5,280,326 A | 1/1994 | Pinhas et al. |
| 5,286,593 A | 2/1994 | Landa et al. |
| 5,286,948 A | 2/1994 | Landa et al. |
| 5,289,238 A | 2/1994 | Lior et al. |
| 5,300,390 A | 4/1994 | Landa et al. |
| 5,315,321 A | 5/1994 | Peled et al. |
| 5,330,872 A | 7/1994 | Materazzi |
| 5,335,054 A | 8/1994 | Landa et al. |
| 5,337,131 A | 8/1994 | Sagiv et al. |
| 5,346,796 A | 9/1994 | Almog |
| 5,376,491 A | 12/1994 | Krumberg et al. |
| 5,380,611 A | 1/1995 | Landa |
| 5,407,771 A | 4/1995 | Landa et al. |
| 5,426,491 A | 6/1995 | Landa et al. |
| 5,436,706 A | 7/1995 | Landa et al. |
| 5,497,222 A | 3/1996 | Landa et al. |
| 5,508,790 A | 4/1996 | Belinkov et al. |
| 5,527,652 A | 6/1996 | Krumberg et al. |
| 5,552,875 A | 9/1996 | Sagiv et al. |
| 5,554,476 A | 9/1996 | Landa et al. |
| 5,555,185 A | 9/1996 | Landa |
| 5,557,376 A | 9/1996 | Landa et al. |
| 5,558,970 A | 9/1996 | Landa et al. |
| 5,570,193 A | 10/1996 | Landa et al. |
| 5,571,645 A | 11/1996 | Landa |
| 5,572,274 A | 11/1996 | Lior et al. |
| 5,585,900 A | 12/1996 | Lior et al. |
| 5,592,269 A | 1/1997 | Younes et al. |
| 5,596,396 A | 1/1997 | Landa et al. |
| 5,610,694 A | 3/1997 | Lior et al. |
| 5,636,349 A | 6/1997 | Landa et al. |
| 5,655,194 A | 8/1997 | Landa et al. |
| 5,737,666 A | 4/1998 | Lior et al. |
| 5,745,829 A | 4/1998 | Gazit et al. |
| 5,749,032 A | 5/1998 | Landa et al. |
| 5,759,733 A | 6/1998 | Tsubuko |
| 5,792,584 A | 8/1998 | Almog |
| 5,793,490 A | 8/1998 | Forgacs et al. |
| 5,854,960 A | 12/1998 | Tagansky et al. |
| 5,864,353 A | 1/1999 | Gila et al. |
| 5,900,003 A | 5/1999 | Ben Dror |
| 5,915,152 A | 6/1999 | Meiri et al. |
| 5,923,929 A | 7/1999 | Ben Avraham et al. |
| 5,935,754 A | 8/1999 | Almog |

LIQUID TONER AND METHOD OF PRINTING USING SAME

RELATED APPLICATIONS

The present application is a U.S. national application of PCT/IL00/00031, filed Jan. 17, 2000. The present application is also a continuation-in-part of U.S. patent application Ser. No. 08/203,596 filed Feb. 28, 1994 now U.S. Pat. No. 6,146,803 which is a continuation of U.S. patent application Ser. No. 07/676,422 filed Mar. 28, 1991 now abandoned.

FIELD OF THE INVENTION

The present invention is related to the field of electrostaographic printing and especially to the field of printing, using liquid toner.

BACKGROUND OF THE INVENTION

Modern liquid toner electrostatic imaging began with the invention of a new class of toners referred to herein as ElectroInk® (which is a trademark of Indigo, Nev. of The Netherlands). This toner is characterized by its comprising toner particles dispersed in a carrier liquid, where the toner particles are comprised of a core of a polymer with fibrous extensions extending from the core. When the toner particles are dispersed in the carrier liquid in a low concentration, the particles remain separate. When the toner develops an electrostatic image the concentration of toner particles increases and the fibrous extensions interlock. A large number of patents and patent applications are directed toward this type of toner and charge directors which are comprised in it. These include: U.S. Pat. Nos. 4,794,651; 4,842,974; 5,047,306; 5,407,307; 5,192,638; 5,208,130; 5,225,306; 5,264,312; 5,266,435; 5,286,593; 5,300,390; 5,346,796; 5,407,771; 5,554;476; 5,655,194; 5,792,584 and U.S. Pat. No. 5,5923,929, PCT Patent publication WO/92/17823 (equivalent to U.S. patent application Ser. No. 08/203,596) and PCT patent application PCT/IL99/00394, the disclosures of all of which are incorporated herein by reference.

It has been discovered that this type of toner allows for high quality offset printing at high speed. However, this type of printing is described inter alia in patents and patent application Nos. 4,678,317; 4,860,924; 4,980,259; 4,985,732; 5,028,964; 5,034,778; 5,047;808; 5,078,504; 5,117,263; 5,148,222; 5,157,238; 5,166,734; 5,208,130; 5,231,454; 5,255,058; 5,266,435; 5,268,687; 5,270,776; 5,276,492; 5,278,615; 5,280,326; 5,286,948; 5,289,238; 5,315,321; 5,335,054; 5,337,131; 5,376,491; 5,380,611; 5,426,491; 5,436,706; 5,497,222; 5,508,790; 5,527,652; 5,552,875; 5,555,185; 5,557,376; 5,558,970; 5,570,193; 5,571,645; 5,572,274; 5,585,900; 5,592,269; 5,596,396; 5,610,694; 5,636,349; 5,655,194; 5,737,666; 5,745,829; 5,749,032; 5,793,490; 5,854,960; 5,864,353; 5,900,003; 5,915,152; 5,923,929; 5,935,754 and PCT publications (now U.S. patent applications) WO 96/29633 (08/930,249); WO 96/35182 (08/945,415); WO 96/29633 (08/894,707); WO 97/07433 (09/011,634); WO 97/39385 (09/171,396); WO 98/55901 (09/445,035) and WO 99/454,433 and PCT applications PCT/IL98/00553 and PCT/IL99/00363, the disclosures of all of which are incorporated herein by reference. Systems incorporating various ones of these patents are sold under the names E-Print 1000®, Omnius®, Turbostream™ and Cardpress™.

In the course of time various methods for development of latent electrostatic images have been developed for liquid toner, as described in the above referenced patents and patent applications. In addition, the speed of printing has increased. Printing is performed on a large number of materials. Other operating conditions have also changed.

In general, Electroink comprises a polymer or polymers (usually pigmented) which solvate the carrier liquid at some temperature above room temperature (and preferably above normal storage temperatures of 30–40° C.) and do not solvate the carrier liquid or dissolve substantial amounts of it below that temperature. Above the solvation temperature the polymer adsorbs the carrier liquid and is plasticized and softened by it. At elevated temperatures the toner material is thus soft enough to bond with a paper substrate. In practice, the temperature and pressure at which transfer to paper is made is controlled so that the transfer is complete, the transferred toner is fixed to the paper and the image is not squashed.

PCT publication WO 92/17823 (U.S. patent application Ser. No. 08/203,596) discloses a toner comprising two components in which the viscosity vs. temperature characteristics are specified. In particular, it was found that toner based on a mixture of polymers having a break-point on a semi-logarithmic plot of viscosity vs. temperature at between $3 \times 10^5$ and $5 \times 10^6$ at a temperature of below 65° C., when in a 40% by weight of toner polymer mixed with carrier liquid, allowed for good transfer and fixing of the image at relatively low transfer blanket temperatures. This weight percentage was chosen as a standard since it represented a proportion believed to exist during transfer of the toner to a paper substrate.

SUMMARY OF THE INVENTION

An aspect of some preferred embodiments of the invention is concerned with liquid toners comprising pigmented toner particles in a carrier liquid. Preferably, the polymer in a 40% weight to weight mixture with carrier liquid, has a break point on a semi-logarithmic viscosity vs. temperature curve at between $3.8 \times 10^3$ centipoise and a value below $5.3 \times 10^5$ centipoise and a temperature of below 68° C., more preferably below 65° C. In preferred embodiments of the invention, the toner particle polymer is comprised of two or more polymers.

Preferably one of the polymers comprises a first, relatively higher viscosity material in an amount of between 70 and 90 percent and a second polymer having a second, relatively lower viscosity in an amount of between 5 and 25 percent. In some preferred embodiments of the invention, a third polymer having a relatively low viscosity is comprised in the toner polymer in an amount between 2 and 10 percent. In preferred embodiments of the invention, the third polymer is reactive with components of a substrate on which the toner is printed.

The present inventors have found that under conditions in which the amount of pigment in the toner is increased over that in prior art (and thus thinner layers of toner are utilized) and/or in which the amount of liquid is reduced by removing liquid from toner prior to its transfer, and/or in which the speed of the process is increased and the time available for transfer to the paper decreased, the optimum viscosity is reduced over that of toners of the prior art.

An aspect of some preferred embodiments of the invention relates to a toner including a polymer material that is reactive with a substrate on which it is printed.

In general, printing with toner materials on paper is relatively straightforward, especially when transfer thereto is by heat and pressure, since the toner is forced into the paper and forms a good bond with it.

Thus, in a preferred embodiment of the invention the polymers utilized include a minor proportion of a first polymer having a relatively greater reactive affinity for the paper and a major portion of a second polymer having substantially no reactive affinity or a relatively smaller reactive affinity of the paper. In preferred embodiments of the invention, the first polymer comprises between 2–10% of the total amount of polymer in the toner particles. In some preferred embodiments of the invention, the second polymer is a mixture of polymers.

In one preferred embodiment of the invention the first polymer has an anhydride functionality and is compatible (forms a homogeneous mixture) with the other toner polymers in the particles. The anhydride functionality is believed to form a bond, at the fixing temperature of about 70–90° C., with the cellulose in the paper. In particular, it is believed that the oxygen in the anhydride bonds with hydrogen in the cellulose. Thus, under high speed printing conditions, the anhydride (or other material with a high affinity for paper) provides for adequate boding of the toner to the paper, despite the relatively shorter times available for transfer of the toner to the paper and for fusing it thereto.

The first polymer may be in the form of a terpolymer containing an anhydride functionality, such as maleic anhydride terpolymer or it may, for example, be maleic anhydride grafted linear low density polyethylene, maleic anhydride grafted polypropylene copolymer, maleic anhydride grafted linear ethylene acetate polymer. Other materials with anhydride functionality may also be used.

Other minor portion polymers believed to work in a similar manner include polymers having an epoxy functionality. It is believed that when activated by water or hydroxyl functionalities in the paper, the epoxy functionality bonds with hydroxyl functionalities in the paper.

While the second polymer may include any polymer or mixture of polymers having suitable viscosity, solvation and other parameters for toner, some especially suitable first polymer materials include, ethylene methacrylic acid copolymers and their ionomers, ethylene acrylic acid copolymers and their ionomers, polyamides, etc., or mixtures thereof It should be understood that some of these materials may have higher or low than optimal viscosity and that blends of the polymers may be required to provided a desired viscosity.

There is thus provided, in accordance with a preferred embodiment of the invention, a liquid toner comprising:
  a carrier liquid; and
  toner particles dispersed in the carrier liquid, said toner
    particles comprising:
    a polymer blend comprising:
      a first polymer comprising a minor portion of said blend and having a relatively higher chemical reactivity with paper; and
      a second polymer comprising a major portion of said blend and having a relatively lower or null chemical reactivity with paper.

Preferably, the polymer blend has, on a semi-logarithmic viscosity vs. temperature cooling curve, a transition at a temperature below about 65° C., wherein at temperatures below the transition temperature, the rate of change of viscosity with temperature is higher than the rate of change at temperatures above the transition temperature.

Preferably, at the transition temperature, the viscosity is below about $10^7$ centipoise.

Preferably, at the transition temperature, the viscosity is below about $2 \times 10^5$ centipoise.

Preferably, at the transition temperature, the viscosity is above about $10^4$ centipoise.

In a preferred embodiment of the invention the second polymer comprises at least two polymers.

In a preferred embodiment of the invention, the polymer blend is substantially insoluble in the carrier liquid and wherein at least one of the polymers solvates the carrier liquid at an elevated temperature.

In a preferred embodiment of the invention, the proportion of the first polymer in the blend is between about 2% and about 10%, preferably about 5%. In a preferred embodiment of the invention, the first polymer comprises a polymer having an anhydride functionality. The first polymer may include, in accordance with various preferred embodiments of the invention, one or more of maleic anhydride terpolymer, maleic anhydride grafted linear low density polyethylene, maleic anhydride grafted polypropylene copolymer, and maleic anhydride grafted linear ethylene acetate polymer.

In preferred embodiments of the invention, the second polymer comprises one or more of ethylene methacrylic acid copolymer; an ionomer of ethylene methacrylic acid copolymer, an ester of ethylene methacrylic acid copolymer, low molecular weight ethylene acrylic acid copolymer, an ionomer of low molecular weight ethylene acrylic acid copolymer, an ester of ethylene acrylic acid copolymer, and an acid modified ethylene vinyl acetate terpolymer.

Preferably, the toner particles comprise at least one pigment.

There is further provided, in accordance with a preferred embodiment of the invention, a liquid toner comprising:
  a carrier liquid; and
  toner particles dispersed in the carrier liquid, said toner
    particles comprising:
    a polymer blend comprising at least first and second distinct polymers, wherein the polymer blend has, on a semi-logarithmic viscosity vs. temperature cooling curve, a transition at a temperature below about 65° C., wherein at temperatures below the transition temperature, the rate of change of viscosity with temperature is higher than the rate of change at temperatures above the transition temperature.

In a preferred embodiment of the invention, the transition temperature, the viscosity is below about $10^7$ centipoise. Preferably, at the transition temperature, the viscosity is below about $2 \times 10^5$ centipoise.

In a preferred embodiment of the invention, at the transition temperature, the viscosity is above about $10^4$ centipoise.

In a preferred embodiment of the invention, the polymer blend is substantially insoluble in the carrier liquid and wherein at least one of the polymers solvates the carrier liquid at an elevated temperature.

In a preferred embodiment of the invention, the polymer blend comprises one or more of ethylene methacrylic acid copolymer, an ionomer of ethylene methacrylic acid copolymer, an ester of ethylene methacrylic acid copolymer, low molecular weight ethylene acrylic acid copolymer, an ionomer of low molecular weight ethylene acrylic acid copolymer, an ester of ethylene acrylic acid copolymer, or an acid modified ethylene vinyl acetate terpolymer.

Preferably, the toner particles comprise at least one pigment.

There is further provided, in accordance with a preferred embodiment of the invention, a method of printing comprising:

providing an electrostatic image; and developing the electrostatic image with a toner in accordance with any of the preceding claims.

Preferably, the method includes transferring the developed image from a surface on which it is developed to a final substrate.

Preferably, the final substrate contains cellulose.

In a preferred embodiment of the invention, the developed image comprises first transferring the image to an intermediate transfer member and then transferring the image therefrom to the final substrate.

In a preferred embodiment of the invention, transferring comprises fixing the transferred image to the final substrate.

BRIEF DESCRIPTION OF THE DRAWINGS

The present invention will be more clearly understood from the following description of the preferred embodiments thereof, taken together with the following drawings, in which.

DETAILED DESCRIPTION OF PREFERRED EMBODIMENTS OF THE INVENTION

Non-limiting Examples of Toners

Figure 1:
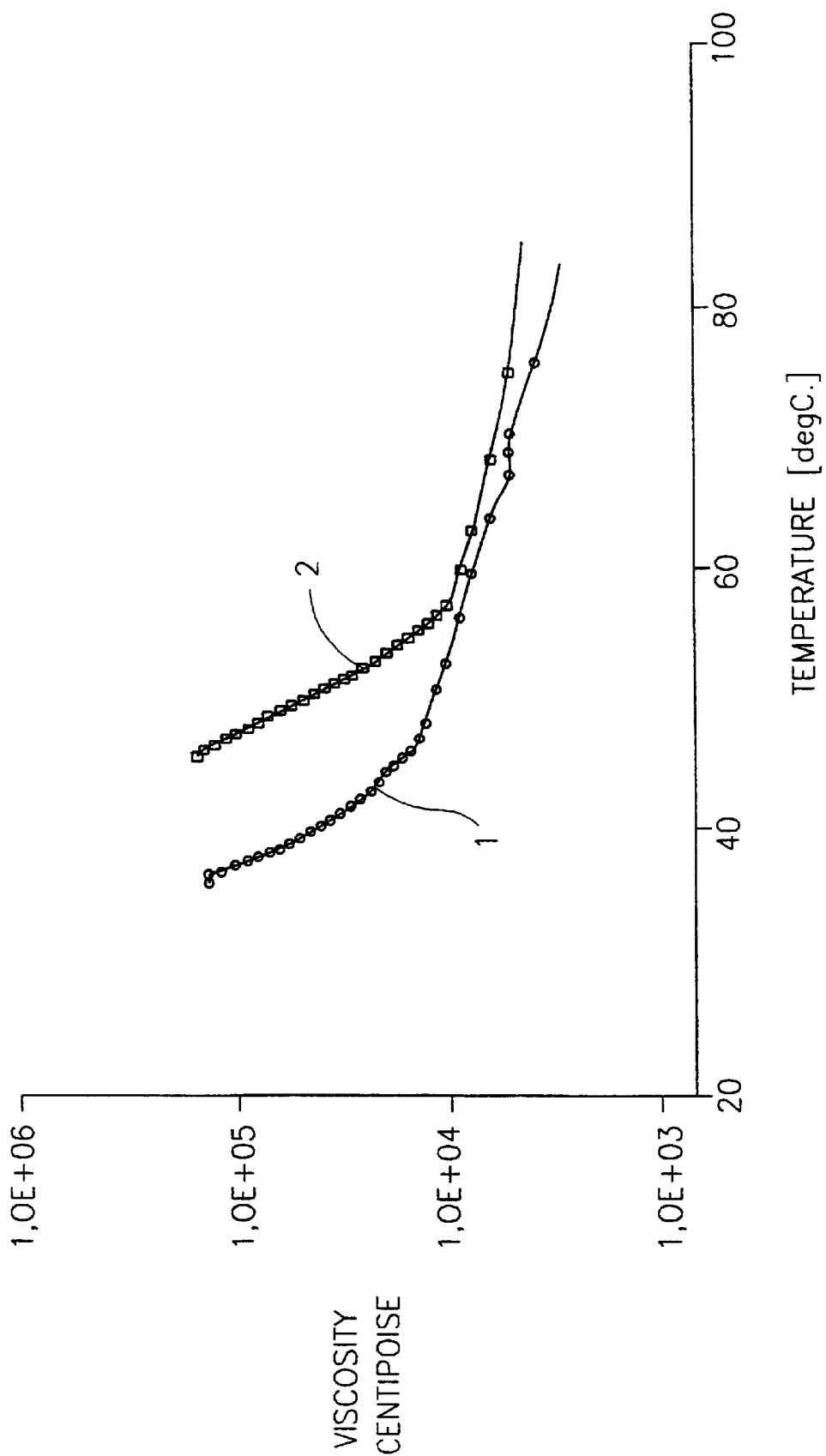
FIG. 1 shows a semi log plot of viscosity in centipoise as a function of temperature of a melt viscosity cooling curve of two toners, in accordance with a preferred embodiment of the invention.

A first exemplary toner, in accordance with a preferred embodiment of the invention, can be prepared by loading 1020 grams of Nucrel 699 resin (an ethylene methacrylic acid copolymer by Dupont), 120 grams of AC5120 resin (an ethylene acrylic acid copolymer by Allied Signal) with 60 grams of Lotadar 8200 (maleic anhydride terpolymer by Atochem) and 1800 grams of Isopar-L (Exxon) an isopparaffinic hydrocarbon fraction in a Ross double planetary mixer, preheated by a heating bath, set to 150° C. The ingredients are mixed for about 1.5 hours at speed control setting 3. The speed is increased to a speed setting of 6 for 30 minutes, the heating is stopped and the mixer is cooled with a fan while mixing is continued. The result is a pasty material. It is noted, for the reasons given in the summary, that the maleic anhydride has a higher affinity for paper than do the other polymers.

836.30 grams of the pasty material are loaded into a 1S attritor (Union Process) with 3/16" chrome steel grinding media, together with 67.07 grams of Helliogen Blue pigment 7080 (BASF), 7.45 grams of Helliogen Green pigment (BASF), 4.14 grams of aluminum stearate (Riedel de Haen) and 1384.07 grams of Isopar L. The material is ground at 40° C. for 20 hours. The result is discharged from the attritor and mixed with an amount of Isopar L to form a working dispersion. The toner is charged utilizing a charge director, preferably a charge director described in the above referenced U.S. Pat. No. 5,346,796 and containing 30 parts by weight lecithin, 30 parts by weight Basic Barium Petronate (BBP) and 6 parts by weight isopropylamine dodecylbenzesulfonate (ICI G3300B) as a stabilizer. The charge director, dissolved in Isopar-L is added in an amount of about 30–40 mg of solids of the charge director per gram of toner solids. A small amount of Marcol 82, such as 2% of the carrier liquid, may be added to carrier liquid to form a mixed carrier liquid, as described in the above references.

The result is a cyan toner having a relatively high pigment concentration.

A second exemplary toner, in accordance with a preferred embodiment of the invention, can be prepared by loading 960 grams of Nucrel 699 resin (an ethylene methacrylic acid copolymer by Dupont), 240 grams of AC5120 resin (an ethylene acrylic acid copolymer by Allied Signal) 1800 grams of Isopar-L (Exxon) in a Ross double planetary mixer, preheated by a heating bath, set to 150° C. The ingredients are mixed for about 1.5 hours at speed control setting 3. The speed is increased to a speed setting of 6 for 30 minutes, the heating is stopped and the mixer is cooled with a fan while mixing is continued. The result is a pasty material.

971.75 grams of the pasty material are loaded into a 1S attritor (Union Process) with 3/16" chrome steel grinding media, together with 55.66 grams of Helliogen Blue pigment 7080 (BASF), 4.14 grams of Helliogen Green pigment (BASF), and 11.5 grams of aluminum stearate (Riedel de Haen) and 1257 grams of Isopar L. The material is ground at 58° C. for about 1.5 hours, followed by continued grinding at 45° C. for 10.5 hours. The result is discharged from the attritor and mixed with an amount of Isopar L to form a working dispersion at about 2% solids. The toner is charged utilizing a charge director, preferably a charge director described in the above referenced U.S. Pat. No. 5,346,796 and containing 30 parts by weight lecithin, 30 parts by weight BBP and 15 parts by weight G3300 as a stabilizer. The charge director, dissolved in Isopar-L is added in an amount of about 30–40 mg of solids of the charge director per gram of toner solids.

The result is a cyan toner having a relatively high voltage stability, for use in high speed printing. For black toner an additional 2.5 mg/gm of stabilizer is added.

FIG. 1 shows viscosity as a function of temperature (cooling curves) for the polymer materials used in the two toners. Curve 1, is for the polymer material in the first exemplary toner and curve 2 is for the polymer materials in the second exemplary toner. It is seen that these materials have a break-point at about 45° C. and $1.05 \times 10^4$ centipoise and at about 55° C. and $10^4$ centipoise, respectively, when mixed with Isopar-L in a 40% w/w concentration.

In general, while, in the past toners with a higher viscosity at these standard conditions was desirable, the lower viscosity toners, as described herein, work well in environments in which the solids concentration is higher at transfer to the paper (for example due to increased evaporation of carrier liquid) or in which the time allotted for transfer is greatly reduced.

It will be further understood that many variations of the toners according to the invention are possible and the toners that are defined by the claims may be produced using a wide variety of polymers. In particular, other ethylene methacrylic acid copolymers and ionomers and esters of ethylene methacrylic acid copolymers of various molecular weights may be used in place of Nucrel 699. In some preferred embodiments of the invention low molecular weight ethylene acrylic acid copolymers and/or their ionomers and esters and/or other terpolymers such as an acid modified ethylene vinyl acetate terpolymer (ELVAX) may be substituted for the specific AC 5120 resin indicated above. In some preferred embodiments of the invention the polymer having a relatively greater reactive affinity for cellulose can be any suitable polymer having an anhydride or epoxy functionality or other polymer that strongly bonds chemically to paper, preferably to hydrogen or to hydroxyl functionalities of the cellulose. Examples of materials with anhydride functionalities believed to be suitable for use in the present invention include a terpolymer containing an anhydride functionality, maleic anhydride grafted linear low density polyethylene, maleic anhydride grafted polypropylene copolymer, and maleic anhydride grafted linear ethylene acetate polymer.

Figure 2:
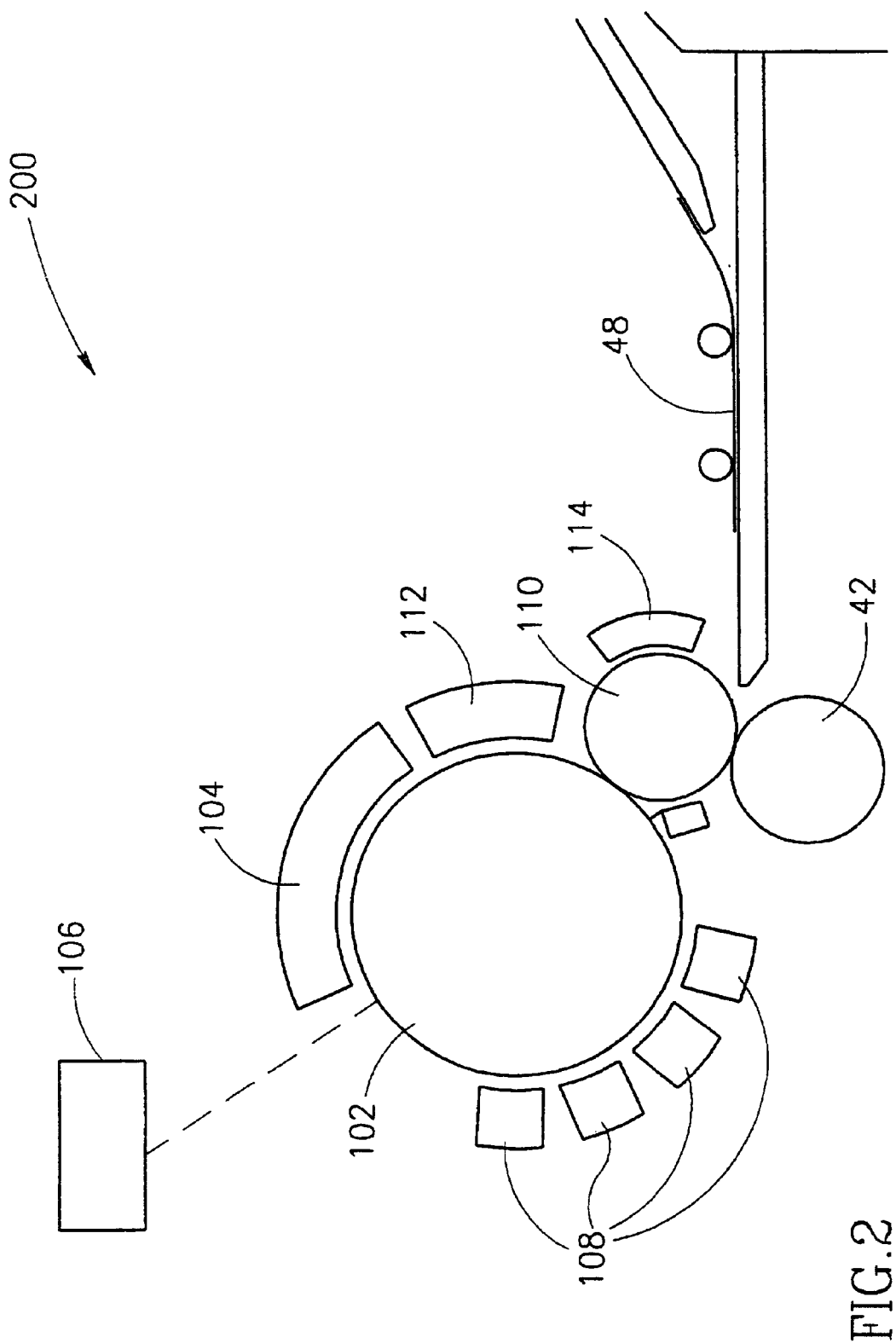
FIG. 2 is a schematic drawing of a liquid toner printing system utilizing a toner in accordance with a preferred embodiment of the invention.

FIG. 2 shows a high speed printer for which the first exemplary toner is designed. This system is described in detail in PCT application PCT/IL98/00553. The reader is referred to that application for more details on the operation of the printer.

Printer 200 of FIG. 2, utilizes a single photoreceptor 102 and a single intermediate transfer member (ITM) 110. However, situated about photoreceptor 102 are a plurality of developers 108. Each developer develops an electrostatic image on photoreceptor 102 with a different color image. The images are transferred seriatim to an intermediate transfer member 110. In a preferred embodiment of the invention, a sheet 48 on an impression roller 42 rotates once for each color and the different color images are transferred to the sheet seriatim. Preferably, photoreceptor 102 is large enough so that a plurality or all of the individual color images are developed during a single rotation of photoreceptor 102. Alternatively, the images are transferred seriatim to the intermediate transfer member and then transferred together to the sheet. In this type of one-shot transfer, the sheet travels at the process speed, but is printed on only once. The developer (which is preferably of the type described in WO 93/01531 or in WO 95/10801) and other components of the printing engine are described with reference to FIGS. 11–13 of the '553 application. Other printing engines, as for example those shown in FIGS. 2–5 of the '553 application can also be used.

In the embodiment for which the first exemplary toner was described, the process speed is 122 cm/sec and the surface temperature of the intermediate transfer member is between 95 and 100° C. A fan optionally blows air on the image on the ITM to increase the solids concentration prior to transfer from the ITM. In order to assure good transfer from the intermediate transfer member in the approximately 1 cm nip between the ITM and the impression roller the an exemplary pressure of about 6.4 kg/cm$^2$ is applied. In addition, to assure transfer of the toner to the intermediate transfer member an exemplary transfer voltage of about 650 Volts is used.

The second exemplary toner is useful in conjunction with more conventional systems as described in the above referenced patents and applications, in which a same conventional roller developer is used for developing all of the separations and a low toner particle concentration liquid toner (such as 2%) is introduced in the space between the developer roller and the. In this system, the process speed is about 61 cm/sec and the pressure is about 5 kg/cm$^2$. The transfer voltage is about 650 Volts. The interested reader is directed to these publications for further details.

It will be understood that, in view of the results presented herein and in WO 92/17823 (U.S. Ser. No. 08/203,597), break points in the standard cooling curve for useful toner polymers, may vary, depending on the printing conditions, occurring between 10$^4$ (or less) centipoise to above 10$^7$ centipoise. Preferably, of course, the temperature is below 65° C., more preferably 60° C. or below.

It will be understood that the particular materials and proportions of materials are provided for exemplary purposes only. As is well known in the art, the proportions, temperatures, mixing times and grinding times as well as the choice of charge director can be varied substantially in the production of liquid toner. Furthermore, while a number of different embodiments have been shown, details of one embodiment of the invention may, where applicable, in other embodiments of the invention. Similarly, some details shown in the embodiments, while preferred, are not essential and some preferred embodiments of the invention may omit them.

As used herein, the terms "have", "include" and "comprise" or their conjugates, as used herein mean "including but not limited to".

What is claimed is:

1. A liquid toner comprising:

a carrier liquid; and toner particles dispersed in the carrier liquid, said toner particles comprising:

a polymer blend comprising at least first and second distinct polymers, wherein the polymer blend has, on a semi-logarithmic viscosity vs. temperature cooling curve, in a 40% non-volatile mixture of toner and carrier liquid, transition at a temperature below about 65° C., wherein at temperatures below the transition temperature, the rate of change of viscosity with temperature is higher than the rate of change at temperatures above the transition temperature.

2. A liquid toner according to any of claim 1 wherein at the transition temperature, the viscosity is below about 10$^7$ centipoise.

3. A liquid toner according to claim 2 wherein at the transition temperature, the viscosity is below about 10$^5$ centipoise.

4. A liquid toner according to any of claim 1–3 wherein at the transition temperature, the viscosity is above about 10$^4$ centipoise.

5. A liquid toner according to any of clams 1–3 wherein the polymer blend is substantially insoluble in the carrier liquid and wherein at least one of the polymers solvates the carrier liquid at an elevated temperature.

6. A liquid toner according to any of claims 1–3 wherein the polymer blend comprises ethylene methacrylic acid copolymer.

7. A liquid toner according to any of claims 1–3 wherein the polymer blend comprises an ionomer of ethylene methacrylic acid copolymer.

8. A liquid toner according to any of claims 1–3 wherein the polymer blend comprises an ester of ethylene methacrylic acid copolymer.

9. A liquid toner according to any of claims 1–3 wherein the polymer blend comprises low molecular weight ethylene acrylic acid copolymer.

10. A liquid toner according to any of claims 1–3 wherein the polymer blend comprises an ionomer of low molecular weight ethylene acrylic acid copolymer.

11. A liquid toner according to any of claims 1–3 wherein the polymer blend comprises an ester of ethylene acrylic acid copolymer.

12. A liquid toner according to any of claims 1–3 wherein the polymer blend comprises an acid modified ethylene vinyl acetate terpolymer.

13. A liquid toner according to any of claims 1–3 wherein the toner particles comprise at least one pigment.

14. A method of printing comprising:

providing an electrostatic image; and developing the electrostatic image with a toner in accordance with any of claims 1–3.

15. A method according to claim 14 and including transferring the developed image from a surface on which it is developed to a final substrate.

16. A method according to claim 15 wherein the final substrate contains cellulose.

17. A method according to claim 15 wherein the final substrate is a paper.

18. A method according to claim 15 wherein transferring the developed image comprises first transferring the image to an intermediate transfer member and then transferring the image therefrom to the final substrate.

* * * * *

UNITED STATES PATENT AND TRADEMARK OFFICE
CERTIFICATE OF CORRECTION

PATENT NO.      : 6,623,902 B1
DATED           : September 23, 2003
INVENTOR(S)     : Peretz Ben-Avraham et al.

It is certified that error appears in the above-identified patent and that said Letters Patent is hereby corrected as shown below:

Title page,
Item [56], References Cited, OTHER PUBLICATIONS, "MITA IND KK" reference, change "Accssion" to -- Accession --.

Column 1,
Line 36, change "5,554;476" to -- 5,554,476 --
Line 37, change "5,5923,929" to -- 5,923,929 --
Line 59, change "WO 99/454,433" to -- WO 99/454433 --

Column 7,
Line 32, after "roller" delete -- the --
Line 43, after "and the" add -- photoreceptor --

Column 8,
Line 11, before "transition" add -- a --
Line 25, change "clams" to -- claims --

Signed and Sealed this

Twenty-eighth Day of June, 2005

JON W. DUDAS
*Director of the United States Patent and Trademark Office*